June 4, 1963  J. DIAZ-COMPAIN  3,092,480
ENTRAINMENT SEPARATOR ARRANGEMENTS
Filed Sept. 17, 1958  3 Sheets-Sheet 1

INVENTOR
Jeronimo Diaz-Compain
BY Parker & Philpitt
ATTORNEYS

June 4, 1963 J. DIAZ-COMPAIN 3,092,480
ENTRAINMENT SEPARATOR ARRANGEMENTS
Filed Sept. 17, 1958 3 Sheets-Sheet 2

INVENTOR
Jeronimo Diaz-Compain

BY Parker + Philpitt

ATTORNEYS

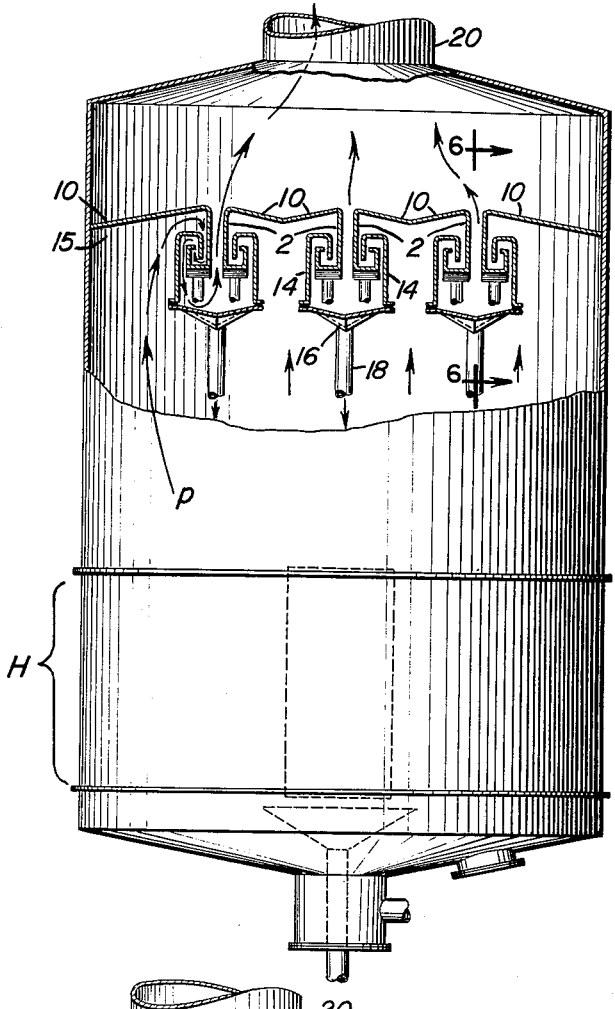
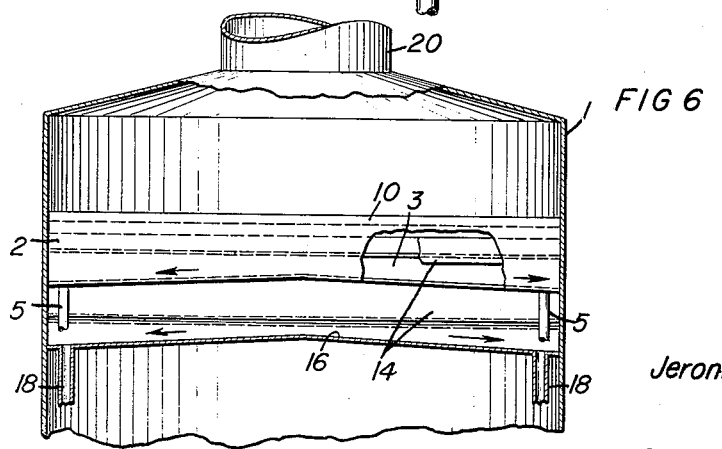

United States Patent Office 3,092,480
Patented June 4, 1963

3,092,480
ENTRAINMENT SEPARATOR ARRANGEMENTS
Jeronimo Diaz-Compain, Havana, Cuba
(P.O. Box 370, New York 25, N.Y.)
Filed Sept. 17, 1958, Ser. No. 761,505
1 Claim. (Cl. 55—423)

This invention generally relates to entrainment separator arrangements which are useful in conjunction with evaporation equipment. More particularly, this invention pertains to entrainment separator arrangements which are useful in conjunction with the equipment utilized in the evaporation of sugar solutions, syrups and similar substances.

One of the most important unit operations in sugar refining is the conversion of dilute sugar solutions to concentrated sugar solutions. This conversion is usually effected by employing multiple effect evaporators. The sugar refining industry is a very competitive industry with the result that the economics of each step of the sugar refining operation becomes quite important. Since the concentration of the dilute sugar solutions represents a considerable percentage of the overall sugar refining costs, workers in this art have devoted a considerable amount of study to ways and means for decreasing costs of the concentrating (evaporating) step. One proposal has been to use multiple effect evaporation systems (e.g. four stage evaporators) and to utilize the latent heat in the vapors emanating from one evaporator unit as a heat source for evaporating liquid in the second stage evaporator. This involves passing hot vapors evolved from the first stage through the heating tubes contained in the second stage (and likewise the hot vapors evolved from the second stage through the heating tubes contained in the third stage—and the hot vapors evolved from the third stage through the heating tubes contained in the fourth stage). The only drawback to this method of economizing heat is that too frequently the water vapors evolved from one stage contain enough entrained sugar droplets to render the water acidic (pH under 7) when it condenses in the heating system of the next succeeding evaporator unit. This acidic condition is undesirable in that it causes accelerated corrosion in the heating equipment—thus shortening both its efficiency and life. In addition, it has been observed that the presence of small amounts of entrained sugar droplets in the vapor passing to the heater or calandria will interfere with the beneficial effects of ammonia in the calandria. Ammonia will normally impart a pH of 8 to 9 in the boiler or calandria of an evaporator. The presence of entrained sugar droplets is also undesirable insofar as vacuum pans, pipe lines, condensers, pumps and other associated equipment is concerned.

Although some manufacturers of evaporating equipment provide some sort of an entrainment separator arrangement in their equipment when it is installed, the entrainment separator arrangements heretofore employed have been found to be far from satisfactory since they still permit a certain undesired amount of entrainment to occur. Entrainments also cause difficulties when they find their way into steam generator plants because of the fermentation and priming.

Objects

It is therefore an object of this invention to provide entrainment separator arrangements which will substantially eliminate entrainment difficulties.

Another object of this invention is to provide means for eliminating the entrainment of sugar solution droplets when evaporating dilute sugar solutions.

Another object of this invention is to provide an entrainment separator arrangement which will utilize some of the force inherently present in moving in order to cause disentrainment.

These and other objects are accomplished by the part, elements, constructions, arrangements and combinations which comprise the present invention, the nature of which are set forth in the following general statement and preferred embodiments of which are set forth in the following description and illustrated in the accompanying drawings, and which are particularly and distinctly pointed out and set forth in the appended claims forming a part hereof.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein if for the purpose of description and not of limitation.

Referring to the drawing, a more detailed description of the present invention will be given.

FIGURE 5 is a vertical section of an evaporator containing another arrangement of entrainment separator means in accordance with this invention.

FIGURE 6 is a sectional view taken along line 6—6 of FIGURE 5.

Figure 1:
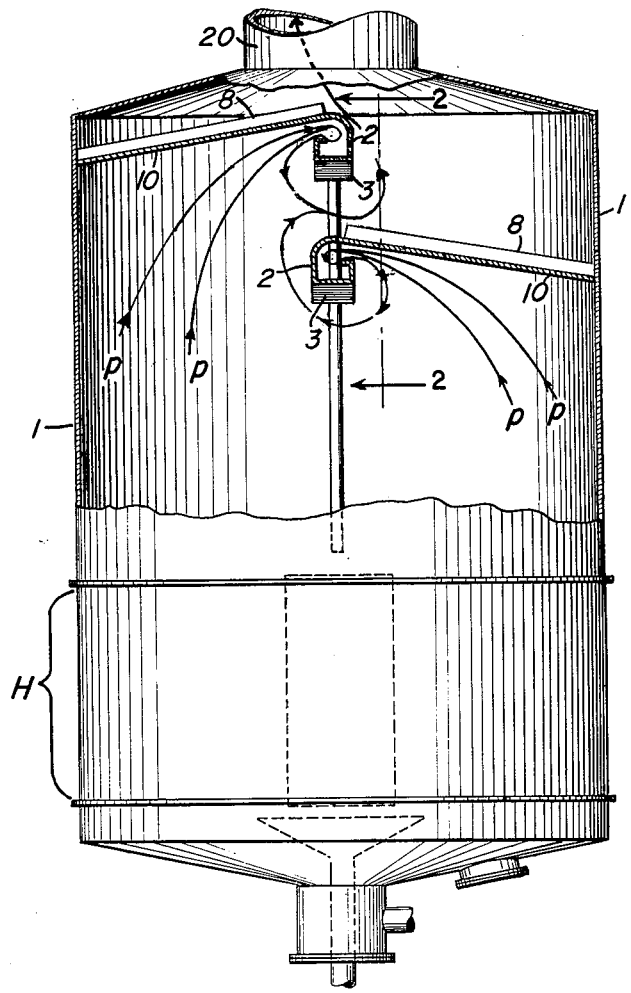
FIGURE 1 is a vertical section of an evaporator unit showing the novel entrainment separator means of this invention.
Figure 2:
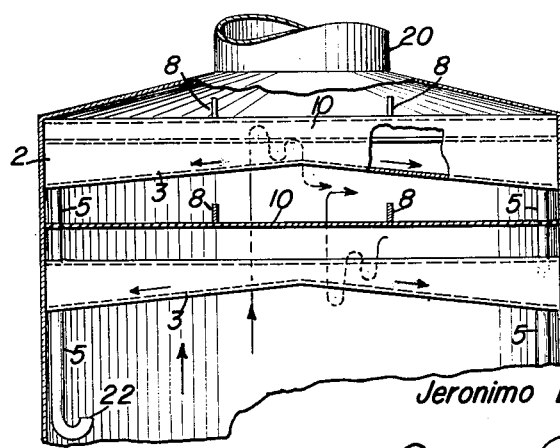
FIGURE 2 is a sectional view along 2—2 of FIGURE 1.
Figure 3:
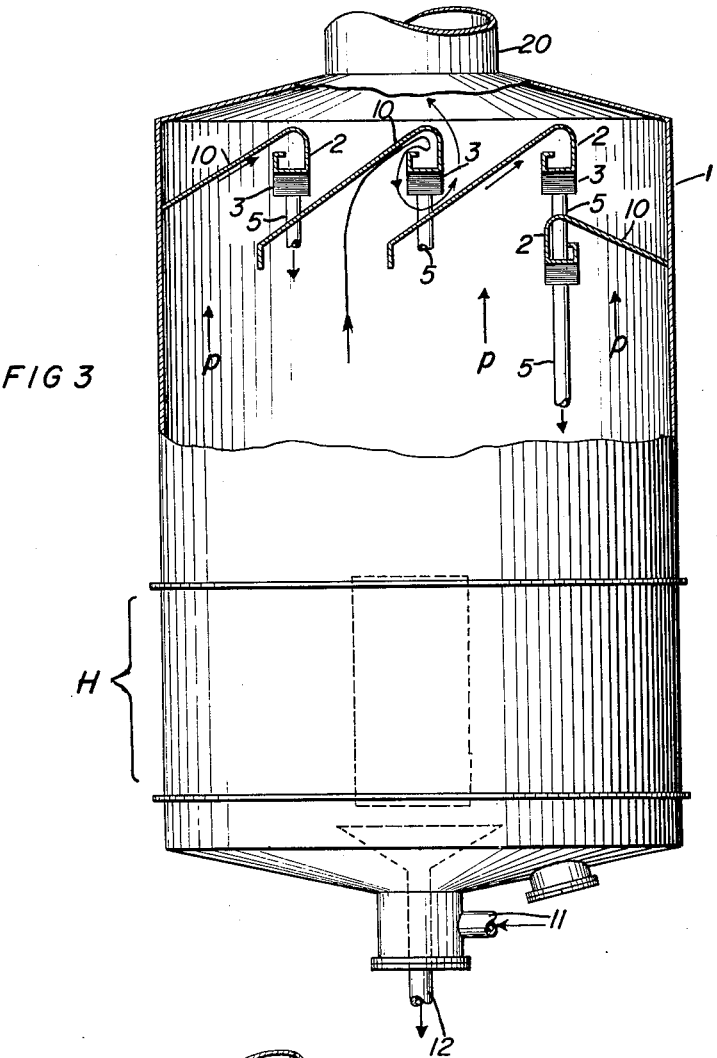
FIGURE 3 is a vertical section of an evaporator showing a slightly different arrangement of entrainment separator means.

It will be seen from the drawings that the entrainment separator arrangement of this invention in its broadest sense comprises the following combination of elements:

(a) Upstanding walls which are adapted to laterally contain a moving stream of vapor and entrained liquid material, (b) At least two entrainment separator deflection baffles extending across a substantial proportion of the cross sectional flow area within said walls, (c) Each of said deflection baffles comprising a substantially flat metallic section whcih is inclined in an upward direction, (d) The uppermost inclined portion of each of said deflection baffles merging into a downwardly projecting flange section, (e) The lower extremity of said downwardly projectinng flange section containing an inwardly-turned channel portion which is shaped to collect and carry off separated liquids.

In FIGURES 1, 2, 3 and 4 it will be seen that the lower portion of the evaporator 1 contains an inlet conduit 11 for the liquids (e.g. sugar solutions) which are to be evaporated. The lower portion of the evaporator 1 also contains a heating section H which usually comprises a tube and sheet type of heater. Any liquid introduced through inlet 11 is heated by the heating section H and the vapor so produced rises upwardly through the heating section H toward the vapor outlet 20 in the top of the evaporator. Liquids are permitted to circulate in and around heating section H for a given amount of time and are then withdrawn through outlet 12. Since the various heating means which are commonly used in evaporators are so well known, and particularly the tube sheets which are used therein, details of the tube sheet arrangement have not been included in the drawings because they do not form any part of the novelty of this invention. Likewise, the inlet 11 for the fluids to the evaporator and the outlet 12 for fluids from the evaporator have not been shown in any great detail, since they do not form any part of the novelty of this invention.

As the vapors produced by the heating section H rise upwardly above the heating section H, there is a great tendency for such vapor to entrain droplets of liquid. The precise degree of entrainment will depend upon a number of factors such as, size of the apparatus, boiling point of the introduced liquid, temperature of the heating section, whether the evaporator is operated under vacuum, etc. Regardless of the degree of entrainment it can generally be said that in most evaporating operations, and particularly when evaporating sugar solutions, entrainment is not desirable.

In accordance with the present invention, the vapors rising from the heating section H (together with the entrain liquid) is deflected by deflection baffles 10. Deflection baffles 10 comprise substantially flat metallic sections which are inclined in an upward direction. The lower edge and sides of deflection baffles 10 are suitably fastened to the walls of the evaporator 1 by welding, bolting or other similar means. If desired, the deflection baffles 10 may be reinforced by one or more reinforcing members 8, preferably constructed of high strength corrosion resistant metal. The angle at which the deflection baffles 10 should be disposed with respect to the horizontal is generally not a critical factor and may be varied within a wide range in order to suit different types of operations and different ranges of evaporator conditions. Angles between 5 and 75 degrees are probably most satisfactory.

The uppermost portion of each deflection baffle 10 merges into a downwardly projecting flange section 2. Deflection baffle 10 preferably merges into flange section 2 by means of a rounded curve section, as shown in the drawings. Flange section need not have any particular spatial position with respect either to the evaporator or the deflecting baffle, but it is preferred that the flange section be substantially parallel to the axis of the evaporator and at an acute angle with respect to the deflecting baffle. Under some special conditions it of course might be suitable to position the deflecting baffle 10 and the flange section 2 between about 90 and 180 degrees with respect to each other, but as a general rule this has not been found to be particularly satisfactory.

The lower edge of flange section 2 is joined to an inwardly turned channel section 3 which is adapted to collect and carry away separated liquid. The exact shape and size of the channel section is not critical under most circumstances. The channel sections 3 are preferably inclined in such a manner that the separated liquid collecting therein will readily flow toward any type of drainage conduit which is provided.

The drawings illustrate drainage conduits 5 adjacent the lower lateral end of each channel section 3. Drainage conduits 5 may either drain into another channel section 3 located at a lower level or the drainage conduit may extend downwardly to a point adjacent to the upper level of the heating section. The lower end of each drainage conduit may either be located above or below the level of the boiling liquid in the evaporator. Also, the lower end of each drainage conduit may contain a U-shaped curve 22 so as to prevent gases from rising upwardly therethrough.

With the above described arrangement it will be seen that as vapor and entrained liquids rise upwardly from the heating section H, they will be deflected with considerable force toward the flange section 3 by the deflection baffle. As the vapor and entrained liquid impinge with great force against the upper portion of the deflection baffle 10 and flange section 3, substantially all of the entrained liquid will "fall out" of the vapor and will collect in channel section 3. The liquid thus separated in channel 3 can be conducted through drainage conduits 5 back to the lower part of the evaporator. After this liquid has "fallen out" the liquid-free vapors are caused to substantially reverse their path of flow by passing out of the channel section and then around and under the channel section, in order to seek the vapor outlet 20. The flow path of the vapors has been indicated by the arrowed line letter P, although it will be appreciated that this is only a general representation since it is not possible to indicate the flow path of the gases with any great degree of exactness.

Figure 4:
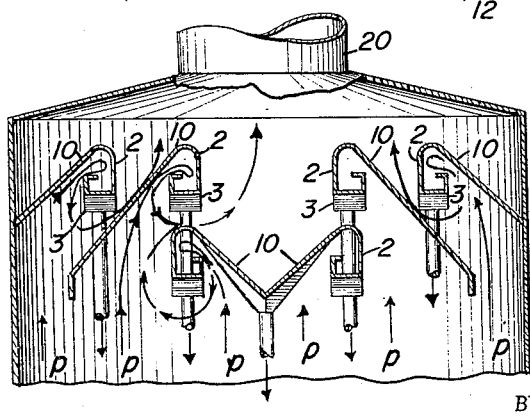
FIGURE 4 is a fragmentary vertical section of an evaporator illustrating still a further embodiment and placement of the novel entrainment separator means of this invention.

It will be seen that FIGURE 4 has six entrainment separator deflection baffles extending across a substantial portion of the cross sectional flow area. Each of said deflection baffles comprises a substantially flat metallic section which is inclined in an upward direction. It will be further seen that two of the deflection baffles adjacent one side of the separator are inclined in one direction, two deflection baffles adjacent the opposite side of the separator are inclined in the opposite direction and the two centrally positioned deflection baffles are inclined in opposite directions to each other and in an opposite direction to the next adjacent deflection baffles.

FIGURES 5 and 6 represent a preferred embodiment of this invention which, while embodying some of the basic components shown in FIGURES 1, 2, 3 and 4, is considerably superior in performance to the embodiments shown in FIGURES 1, 2, 3 and 4 due to the addition of certain other components which shall be described more fully hereinafter. In FIGURES 5 and 6, it will be seen that the deflecting baffles 10, flange sections 2, channel sections 3 and drainage conduits 5 are quite similar to the corresponding components in FIGURES 1, 2, 3 and 4. FIGURES 5 and 6 differ however in that there is provided an additional baffle skirt 14 which serves to guide the liquid-free vapors around the channel sections 3 and toward the vapor outlet 20 so that there is substantially no possibility that the vapors containing the entrained liquid will mix with the liquid-free vapors. As shown in FIGURES 5 and 6, after the liquid-free vapors pass under channel section 3, they must then pass upwardly between the exterior sides of the two flange sections 2 since a baffle plate section 16 (which may be trough-shaped or channel-shaped) bridges the area between two adjacent opposing baffle skirts 14. Baffle plate section 16 first of all prevents vapor containing entrained liquids from by-passing components 10, 2 and 3 and secondly serves to collect any separated liquid which is not collected by channel section 3. Baffle plate sections 16 are preferably inclined so that any liquid collecting therein will flow to suitable drainage conduits 18. The flow path of vapors is generally indicated by the arrowed line lettered P.

While all of the channel sections in the drawings have been shown as sloping from the center outwardly, it would be obvious that these channel sections could also be arranged so that they would slope from the walls of the evaporator toward the center in which event the drainage conduit or conduits would be located adjacent the center rather than the sides.

In conclusion, while the foregoing specification and drawings describe the construction, operation and use of preferred embodiments of the instant invention, it is to be understood that I do not intend to limit myself to the precise constructions and arrangements herein disclosed, since the various details of construction, form and arrangements may obviously be varied to a considerable extent by anyone skilled in the art without really departing from the basic principles and novel teachings of this invention and without sacrificing any of the advantages of the invention, and accordingly, it is intended to encom-

What is claimed is:

An entrainment separator arrangement for systems which are adapted to handle a stream of vapor containing entrained liquids which comprises:

(a) upstanding walls defining the sides of the separator which are adapted to laterally contain a moving stream of vapor and entrained liquid material, (b) six entrainment separator deflection baffles extending across a substantial proportion of the cross sectional flow area within said walls, (c) each of said deflection baffles comprising a substantially flat metallic section which is upwardly inclined in a direction generally pointing from the inlet end of the separator toward the outlet end of the separator, (d) two of said deflection baffles being immediately adjacent to each other and directly attached to one side of the separator and being inclined in one direction, two deflection baffles being immediately adjacent to each other and directly attached to the opposite side of the separator and being inclined in the opposite direction, and the two centrally positioned deflection baffles being inclined in opposite directions to each other and in an opposite direction to the next adjacent deflection baffles, (e) the uppermost inclined portion of each of said deflection baffles merging into a downwardly projecting flange section which substantially reverses direction so as to form an acute angle with respect to the baffle to which it is attached, and (f) the lower extremity of said downwardly projecting flange section containing an inwardly turned channel section which is shaped to collect and carry off separated liquid.

References Cited in the file of this patent

UNITED STATES PATENTS

| | | |
|---|---|---|
| 567,895 | Gaiennie | Sept. 15, 1896 |
| 570,790 | Gaiennie | Nov. 3, 1896 |
| 738,750 | Anderson | Sept. 15, 1903 |
| 1,420,366 | Davis | June 20, 1922 |
| 1,918,005 | Urquhart | July 11, 1933 |
| 2,176,498 | Hickman | Oct. 17, 1939 |
| 2,338,117 | Kermer | Jan. 4, 1944 |
| 2,523,529 | Zwickl | Sept. 26, 1950 |
| 2,805,845 | Berry | Sept. 10, 1957 |